United States Patent Office 3,833,534
Patented Sept. 3, 1974

3,833,534
REINFORCED POLYAMIDE COMPOSITIONS AND PROCESS OF PREPARATION THEREOF
Paul A. Tierney, Ballwin, and Ross M. Hedrick and James D. Gabbert, St. Louis, Mo., assignors to Monsanto Company, St. Louis, Mo.
No Drawing. Continuation of application Ser. No. 888,047, Dec. 24, 1969, which is a continuation-in-part of applications Ser. No. 806,331, Ser. No. 806,332, and Ser. No. 806,333, all Dec. 30, 1968, all now abandoned, which are a continuation-in-part of application Ser. No. 560,247, June 24, 1966, now Patent No. 3,419,517, which in turn is a continuation-in-part of abandoned application Ser. No. 284,375, May 31, 1963. This application June 5, 1972, Ser. No. 260,000
Int. Cl. C08g 51/04, 51/08, 51/10
U.S. Cl. 260—37 N       53 Claims

ABSTRACT OF THE DISCLOSURE

High molecular weight polyamide compositions reinforced with from about 2 to about 55% by volume small particle size crystalline filler and an organosilane coupling agent. Compositions have improved mechanical properties such as concurrent high modulus and high multiaxial impact strength. Also disclosed are processes for preparing the above compositions as well as articles of manufacture.

CROSS REFERENCE TO RELATED APPLICATIONS

This is a streamlined continuation of application Ser. No. 888,047, filed Dec. 24, 1969 which is a continuation-in-part application of earlier copending U.S. patent applications Ser. No. 806,331, Ser. No. 806,332 and Ser. No. 806,333, all filed Dec. 30, 1968 now abandoned, all three of which are continuation-in-part applications of copending U.S. patent application Ser. No. 560,247, filed June 24, 1966, now U.S. 3,419,517, which in turn is a continuation-in-part application of U.S. patent application Ser. No. 284,375, filed May 31, 1963, now abandoned.

BACKGROUND OF THE INVENTION

The present invention pertains to polyamide compositions modified by the inclusion therein of particulate crystalline filler and an organosilane coupling agent. The invention also pertains to processes for preparing the above-described compositions.

It is well known that polyamides may be filled with inorganic fillers and other substances to form uniform compositions. Fillers of various sizes, shapes and amounts have been incorporated into polyamides for a variety of purposes, which include opacification and coloration, increase in abrasion resistance, modification of thermal expansion and conductivity, and cost-lowering dilution of the polymer phase by a cheaper material. The addition to a polyamide, however, of even very minor amounts of these fillers such as carbon black, titanium dioxide and clay, has often had a deleterious effect on the impact strength of the polyamide. And high filler loadings have adversely affected other physical and mechanical properties as well.

More recently, as disclosed in U.S. 3,419,517, hereby totally incorporated herein by reference, it has been possible through the use of coupling agents to improve some mechanical properties of polyamides by incorporating therein relatively large amounts of a variety of particulate inorganic materials. While the compositions of U.S. 3,419,517 can be compounded to exhibit a high modulus of elasticity, strength, and heat distortion temperature, it is always desirable to improve the performance level of any composition. In the case of the foregoing compositions, one area where improvement is particularly desirable is the area of multiaxial impact strength which is a modified, and often better, indication of "on the job" performance than the uniaxial impact strength measured by Izod impact.

It is also known that the impact strength of these and other reinforced polymer compositions may be increased by such methods as the incorporation of a plasticizer or retention of unpolymerized monomer in the polyamide phase. Or reinforced polyamide compositions with improved impact may be formulated by selecting for use polyamides which have high impact strengths themselves. However, the improvement in impact strength thus obtained for any given polyamide composition is inevitably obtained at the expense of a decrease in other important mechanical properties such as the modulus of elasticity. Because of this variable compounding capacity, it is possible to extend the useful range of application of these compositions by tailoring them to suit a particular use. For example, reinforced prior art polyamide compositions ranging from those for applications requiring moderate impact strength but not a high modulus of elasticity, to those for applications requiring high modulus but for which good impact strength is not necessary, may be formulated by the inclusion or exclusion of plasticizer or residual monomer, the increase or decrease in the amount of reinforcing agent, and the proper selection of the matrix polymer. It should be recognized, however, that although this ease of "tailoring" prior art compositions to the requirements of a particular application is a fortunate advantage, it is basically a property-balancing compromise indicating a need for higher performance materials with the cost and fabrication advantages of the prior art reinforced polymer compositions. In addition, most of the inorganic materials used in prior art compositions are overly abrasive in the usual resin processing equipment.

Simultaneous increases in modulus, tensile strength and impact strength over polyamide compositions containing equivalent amounts of inorganic material have been possible through the incorporation of fibrous glass materials into polyamide compositions. However, these increases are specifically associated with the axial direction of the fibers. And generally decreases, particularly with respect to impact strength, are noted in a direction lying in a plane normal to the fiber axis. Since fibrous material tends to align preferentially during forming, molding and other fabrication processes, the mechanical properties of these fiber-reinforced compositions are anisotropically dependent upon this preferential alignment. This deficiency is particularly evident in multiaxial impact strength testing. In addition, the incorporation of even very minor amounts of fibrous materials greatly increases the apparent melt viscosity of a polyamide and thereby renders conventional forming, molding and fabrication techniques extremely difficult or inoperative.

Fillers such as titanium dioxide and carbon black have been homogeneously incorporated into polyamides in minor amounts to serve as nucleating agents to induce crystallization and increase molding speed. Such prior art nucleated induction of crystallization in polyamides, while providing a fast-molding nylon, unfortunately is limited in its usefulness because of the brittleness of the molded product.

It is a purpose of this invention to provide isotropic, particulate-reinforced polyamide compositions with mechanical properties significantly improved by comparison to polyamide compositions of the prior art, and thus increase the range of applicability of reinforced polyamide compositions as engineering materials. Another purpose of this invention is to provide nucleated, fast-molding polyamide compositions with improved mechanical properties which are easily fabricated into useful articles.

SUMMARY OF THE INVENTION

The instant invention relates to reinforced polyamide compositions comprising a polyamide having an intrinsic viscosity of at least about 1.3 and from about 2 to about 55 volume percent based on the total composition of a particulate crystalline inorganic filler material having a Moh's hardness of at least about 4 and a particle size such that about 100% of the particles having a particle size of about 40 microns or less and at least about 95% by weight of the particles have a particle size of about 15 microns or less, said filler material having been treated with an organosilane coupling agent of the formula:

$$X_a\text{—Si}(R\text{—}Z)_c$$
$$|$$
$$Y_b$$

where X is a hydrolyzable group capable of reaction with a hydroxyl group, Y is a hydrogen or a monovalent hydrocarbon group, Z is primary or secondary amino, primary or secondary amido, or epoxy, R is a divalent hydrocarbon group having from 1 to about 20 carbon atoms, $a$ is equal to 1 or more, $c$ is equal to 1 or more, and the sum of $a+b+c$ is 4.

These compositions are characterized by their superior impact strength, particularly with regard to multiaxial impact strength, over prior art polyamide compositions having equivalent moduli of elasticity. The improved multiaxial impact resistance of the compositions is valuable in heavy-duty applications not formerly within the performance range of polyamide compositions. For example, polyamide compositions of the instant invention are successful in some automobile parts applications formerly requiring zinc die-castings.

This invention also relates to a process for preparing some of the compositions of the instant invention comprising conducting a base-catalyzed, substantially anhydrous polymerization of a lactam at a temperature of from about 100° C. to about 295° C., to prepare a polylactam with an intrinsic viscosity of at least about 1.3, said polymerization being carried out in the presence of from about 2 to about 55 percent by volume based on the total composition of a particulate crystalline inorganic filler material having a Moh's hardness of at least about 4 and a particle size such that 100% of the particles have a particle size of about 40 microns or less and at least about 95% by weight of the particles have a particle size of about 15 microns or less and an organosilane coupling agent of the formula set forth above. The instant invention also relates to a process as described above where the reinforced polyamide is subsequently remolded into a finished shape at a temperature at or above the melt temperature of the polyamide.

DESCRIPTION OF THE PREFERRED EMBODIMENTS

Polyamides useful in the compositions of this invention include two broad categories. One category includes the polylactams produced by the polymerization of lactam monomers of the formula

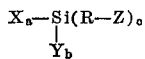

where $R_1$ is an alkylene group having from 3 to 12 or more carbon atoms, preferably from 5 to 12 carbon atoms.

A preferred monomer is ε-caprolactam. Lactam monomers in addition to ε-caprolactam include α-pyrrolidone, piperidone, valerolactam, caprolactams other than the ε-isomer, methyl cyclohexanone isoximes, capryllactam, cyclodecanone isoxime, lauryllactam, etc. A specific polyamide to which this invention is applicable is polycaprolactam, commonly known as nylon 6. Also included are copolymers of two or more of the above or similar lactam monomers as well as copolymers containing more than 50% lactam and a smaller quantity of other monomers polymerizable by an anionic, base-catalyzed mechanism. Examples include copolymers of caprolactam with capryllactam, copolymers of caprolactam with lauryllactam and copolymers of pyrrolidone with piperidone or caprolactam as well as copolymers of a lactam with a polyfunctional lactam such as a bislactam having a formula such as the following:

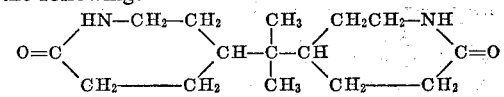

Also included are copolymers and polyblends of the above polylactams with other compatible resin systems. The copolymers or polyblends of this invention are limited to those containing at least 50% by weight polyamide. Most of the preferred compositions will contain at least 90% by weight polyamide in the resin phase. Examples of resins which can be mixed with polyamides to form a blend or copolymer include polypropylene, polyethylene, polyethylene imine, polystyrene, polyacrylonitrile, polybutadiene, acrylonitrile-containing rubbers, styrene-acrylonitrile copolymer and polyphenylene oxide.

The polyamides may be linear or crosslinked. The maximum amount of tolerable crosslinking in the polymer depends upon the proposed use of the finished composition. Moderate crosslinking produces compositions with high temperature resistance and somewhat diminished flexural strength and modulus. Suitable crosslinking agents are well known in the art and can be used here in the conventional manner. Two compounds which have been successfully used include polyethyleneimine and tetra-(3-aminopropoxymethyl) methane. In addition, crosslinking can be achieved through the coupler by condensation of silanol groups to form siloxane linkages, i.e.

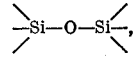

by the use of polyfunctional promoters in a lactam polymerization, such as di and triisocyanates or by the inclusion of polymers such as polyisopropyl acrylamide or polymethyl methacrylate.

Polyamides useful in the practice of the instant invention have an intrinsic viscosity of at least about 1.3, more preferably at least about 1.7, and more preferably at least about 1.9. There is no theoretical upper limit on the intrinsic viscosity of a polyamide useful in the practice of this invention. However, considerations of ease of fabricating articles and general workability lead to the selection of polymers having an intrinsic viscosity not greater than about 3.2, particularly if the composition contains a large amount of reinforcing filler. If, on the other hand, highly filled compositions are not being employed, workable compositions capable of being fabricated into finished articles can contain as the polymeric matrix a polyamide matrix having an intrinsic viscosity as high as 5.0, or even 10.0 or more.

Intrinsic viscosity is determined according to the following formula:

$$\text{Intrinsic Viscosity} = \sqrt{\frac{2}{C}} \times \sqrt{\eta \text{ spec.} - \ln \eta \text{ rel.}}$$

where C is the concentration of polymer in solvent, η spec. is η rel. −1, and η rel. is viscosity of the solution/viscosity of the solvent. Solomon and Ciuta, J. Appl. Polym. Sci., Vol. 6, 686 (1962).

Intrinsic viscosity is used as the limiting factor in describing polyamides useful in this invention because of the ease with which intrinsic viscosity can be measured and the unequivocal nature of the results obtained. Intrinsic viscosity is, however, merely a means of measuring a more fundamental property of the polyamide matrix, i.e. its molecular weight. But polymers in general, including polyamides, do not usually consist of polymeric molecules having uniform molecular weight. Rather they consist of a multitude of molecular species of polymer homologs covering a broad range of weights. The actual distribution of molecular weights of individual molecules depends upon a large variety of factors well known to one skilled in the art. In addition to the variables of the polymerization reaction, reactants, interchange reactions and thermal and mechanical degradation processes, blending of polyamides, or selective removal of particular fractions such as the low molecular weights, will also affect the molecular weight distribution. Since distributions are involved, it is both practical and customary to characterize the molecular size distribution of a given sample by some sort of average value. But since no single-valued variable can fully describe the various distributions that may be present in polymeric substances, the various averages of molecular weight each convey only incomplete resolution of the molecular composition of the polyamide. However, a particular physical property often depends upon a particular average molecular weight so that the determination of this value alone is sufficient for interpretation of that property. For example, the number average molecular weight which represents the total weight of a polymer sample divided by the number of moles of molecules is directly related to the colligative properties of a polymer sample (such as the osmotic pressure of dilute solutions of the sample) and is sensitive to changes in the low end of the molecular weight distribution. Similarly, the weight average molecular weight, which is directly related to such properties as the turbidity of a dilute solution of a polymer sample, is sensitive to larger molecular species and relatively insensitive to the lower end of the molecular weight distribution. In the context of the instant invention, it has been found that the viscosity average molecular weight ($M_v$) is related to the intrinsic viscosity of the polymer. Accordingly, the intrinsic viscosity can be used to distinguish the compositions of this invention from those of the prior art. The determination and meaning of these average molecular weight values are well known to those experienced in the art and may be reviewed in *Principles of Polymer Chemistry*, Chapters VII and VIII, Cornell University Press, 1953, by P. J. Flory. As mentioned earlier, maximum benefits are attained in the instant invention by using polyamides having the intrinsic viscosity values set forth above. Generally speaking, it has been determined that polyamides useful in this invention have viscosity average molecular weights greater than about 29,000 grams per mole, preferably greater than about 40,000 grams per mole, and more preferably greater than about 50,000 grams per mole. There is no upper limit on the molecular weight of useful polyamides, and the crosslinked polymers useful herein may have extremely high molecular weights. However, because of the high apparent melt viscosity of highly filled high molecular weight polyamide compositions, it is advantageous to use a polyamide with a viscosity average molecular weight of less than 100,000 grams per mole in the preparation of highly filled compositions intended for such purposes as injection molding. If, on the other hand, highly filled compositions are not necessary or desirable, the molecular weight of the polyamide can be 200,000 grams per mole, or even as high as 1,000,000 grams per mole or more. It is preferred that a theta solvent such as *m*-cresol, in which the polyamide has approximately the same statistical configuration as it does in a polymer melt, be used in determining the viscosity average molecular weight of the polyamide. Polyamides, which because of crosslinking or branching have a network structure or are of such high molecular weight that they are insoluble in solvents such as *m*-cresol, are nevertheless definitely within the scope of the instant invention.

Fillers useful in the present invention are crystalline, inorganic particles having a certain range of particle sizes and size distributions and having a Moh's hardness of at least four. Many of the fillers preferred for use in this invention have hardnesses between 5 and 7 approximately. Fillers having hardnesses greater than 7 can be used advantageously herein, but their frequently higher cost often makes them less desirable for general use. Use of a filler such as corundum, however, having a hardness of 9 can become desirable or even necessary for special applications.

Crystallinity is an important preferred feature of the fillers of this invention. Although some crystalline forms of a given filler provide compositions with better mechanical properties than other compositions using a different crystalline form of filler, all crystalline fillers are included within the scope of this invention.

It is also necessary that the filler particles be of such a size that 100% of the particles are about 40 microns or less and at least about 95% by weight of the particles have a particle size of 15 microns or less, preferably about 10 microns or less, and more preferably, about 5 microns or less. A preferred maximum particle size limitation is about 30 microns, and even more preferably about 20 microns. Another important characteristic of the fillers useful herein is the amount of filler having a particle size less than the maximum particle size limitation but greater than the smaller specified size. In some instances it is desirable that there be no filler particles greater than 15 microns, i.e. that 100% of the particles be about 15 microns or less, preferably about 10 microns or less. In most instances, fillers having 99% of their particles 15 microns or less are comparable to fillers where 100% of the particles are 15 microns or less. In other instances, a balance of considerations can make a filler having 100% of its particles 30 microns or less and about 96 or 97% of particles 15 microns or less the best choice. The particle size of a filler refers to the largest dimension of the filler particles, the shape of which may vary from being somewhat platelike to somewhat tubular or oblong. The term *particulate* as used in this disclosure refers to granular, platelike, and acicular particles having a length to diameter ratio ($l/d$) up to about 25 to 1. Platelike shapes are considered to be axially compressed particles with an $l/d$ ratio of less than 1. Preferably, the inorganic fillers useful herein have an $l/d$ ratio up to about 20 to 1, and more preferably from about 1 to 15 up to about 15 to 1. In contrast, the term *fibrous* refers to particles whose $l/d$ ratios are greater than 25 to 1, and usually are greater than 50 to 1.

Examples of suitable fillers useful in the practice of this invention include minerals such as alumina, silica, calcined kaolinite, feldspar, mullite, kyanite, wollastonite, hercynite, amosite and other metal silicates, phosphates, aluminates, aluminosilicates, sulfates, sulfides, carbides, etc.; metals such as aluminum, tin, iron, steel, magnesium, titanium, zirconium, vanadium, chromium, manganese, cobalt, copper, nickel and zinc; metal oxides such as oxides of calcium, strontium and barium, tin, lead, magnesium, titanium, zirconium, vanadium, chromium, manganese, iron, cobalt, copper, nickel and zinc; and other inorganic compounds such as boron carbide, calcium carbonate, silicon carbide and carbon black.

A preferred class of fillers particularly preferred for maximizing the advantageous combination of flexural rigidity (modulus) and impact strength are the aluminas, silicas, metal silicates, metal aluminates and aluminosilicates. Alumina and silica are referred to in the plural because of the different crystalline forms of each material and the different particle shapes and sizes which are available.

The principal form of alumina useful herein is α-alumina (corundum). Known natural deposits of α-alumina for mining are limited in extent, and most α-alumina is prepared by heating the various hydrated aluminas to a temperature above about 1000° C. to drive off water and convert them to the α-crystalline form. For example, hydrated alumina ores such as bauxite and laterite may be calcined above 1000° C. to produce a crude α-alumina useful herein. These ores contain not only various amounts of impurities such as silica and kaolin clay which are not deleterious to the usefulness of the calcined product, but also undesirable impurities such as iron oxides and hydroxides. Preferred are the more pure α-aluminas obtained from the calcination of alumina minerals such as diaspore, gibbsite and boehmite. An especially preferred material is the alumina obtained from refining processes for aluminum production such as the Bayer process in which the alumina is dissolved from the ore and recovered as relatively pure hydrated alumina which is then calcined at temperatures above 1000° C. to form α-alumina. However, all forms of unhydrated α-alumina, however prepared, are useful in this invention. Another useful alumina is α-alumina such as that produced by heating the trihydrates or α-monohydrate of alumina between about 900° C. and 1000° C. Unhydrated β-alumina formed in the presence of minor amounts of an alkali is also useful.

Another preferred filler useful in the present invention is calcined kaolin clay. Calcined kaolin clay is a finely divided material which is primarily an amorphous alumina-silica refractory such as that produced by the calcination of kaolin clay. Kaolin clays are clays composed chiefly of kaolin minerals, quartz, feldspar and mica, but may contain small amounts of other mineral or organic materials. Kaolin minerals include kalinite, nacrite, dickite, livesite, halloysite, anauxite and allophane. Kaolinite, halloysite and livesite are preferred because of their favorable particle size and relative abundance while nacrite and dickite may occur naturally in particle sizes which require further subdivision before they are useful herein. Isomorphous substitution of cations in kaolin minerals is not extensive and is not of practical concern, but would be included within the operable limits of the instant invention. Natural residual kaolin clays useful herein, even after processing and refining, may contain various materials other than kaolin minerals. For example, useful commercial kaolinite clays may contain between 80 to 90 percent of kaolin mineral contaminated mainly with quartz, fine-grained micas or hydrous micas, and feldspar. Useful halloysite-bearing clays may contain considerable flint; and all of the useful kaolin clays may contain hydrated alumina minerals such as diaspore, boehmite and gibbsite. In addition to the residual kaolin clays, sedimentary kaolin clays, also known as ball clays, are particularly useful in the compositions of this invention because of their small particle size, which may average 0.5 micron or less. The sedimentary kaolin clays are generally less pure than the residual clays and are composed chiefly of a clay mineral, usually kaolinite or livesite, hydrous mica and quartz, and small quantities of primary mica, titania and some iron and magnesium-bearing minerals. In order to be useful in this invention, it is necessary that the kaolin clays be calcined at a temperature above about 400° C. Preferably, the kaolin clays are calcined at a temperature above 550° C., for ½ hour or more, more preferably at a temperature between about 700° C. and 1000° C. for about 2 hours or more. When the kaolin clays are calcined in this manner, water is driven off, organic material such as lignite is removed, and the crystallinity of the mineral components of the clay is reduced or destroyed.

Still other preferred fillers are those forms of silica having a Moh's hardness of at least about 4. Excluded from the scope of this invention by the above limitation are the amorphous, hydrated forms of silica such as silica aerogels and other forms of precipitated silica, such as may be prepared chemically from a basic silicate such as sodium silicate. Quartz silicas, on the other hand, constitute a preferred class of fillers useful herein. Quartz silica exists in a number of different forms, including α-quartz and β-quartz. The form of quartz known as α-quartz is a particularly preferred form. In addition, other crystalline forms of silica, closely related to quartz, such as cristobalite and tridymite, are also useful herein. Commercially available silicas which can be used in the instant invention are sold under the trade names Novacite, Neonovacite and Minusil. All the foregoing useful silicas have Moh's hardnesses exceeding 4, and usually exceeding 6.

Fillers within the scope of this invention are used with a polyamide and coupler in quantities of from about 2% to about 55% by volume, based on the total composition. The upper limit is determined by the maximum amount of the inorganic filler which can be incorporated into a polyamide while maintaining the improved properties of the compositions. At higher loadings in the range of 30% or more filler, there is difficulty in completely dispersing the filler in the polyamide, as well as difficulty in molding or processing such highly loaded materials because of their high melt viscosity. The lower limit of filler concentration is restricted insofar as is necessary to provide reinforced polyamide compositions with the exceptional improvement in mechanical properties achieved by the compositions of this invention. While filler loadings of 0.25 to 0.75 percent of materials such as carbon black are frequently used as nucleating agents to induce crystallization and modify spherulite size and formation, higher filler loading in the range of 2 percent or more, significantly increases the brittleness of such compositions. The compositions of this invention provide nucleated polyamides with a concentration of nucleating agent greater than about 2 percent based on the polyamide which do not show substantial impairment of their impact strength. Preferred compositions for use as fast molding nucleated polyamides contain from about 2 to about 10 percent by volume filler while preferred compositions for uses requiring a high modulus of elasticity contain from about 10 to about 50 percent by volume filler. Without regard to nucleation capability, one preferred range of filler loading is from about 2 to 20 or 25%, preferably from about 10 to about 20 or 25%, by volume filler. Another range of filler loading often used when mechanical properties are to be maximized is from about 25 to about 55%, preferably from about 30 to about 45%, by volume of the total composition.

In addition to the particulate inorganic filler, a small amount of fibrous material such as glass, cellulose, asbestos, metal and ceramic fibers can be incorporated into the compositions of the instant invention, particularly those containing less than about 25 percent by volume particulate filler, to provide additional, albeit anisotropic, mechanical property improvement.

An essential material in the preparation of our reinforced polyamide compositions is the coupling agent which binds the inorganic filler to the polymer. While a very broad range of silane compounds has been previously used as coupling agents for reinforced thermoplastics, organosilane compounds useful in the preparation of these polyamide compositions having exceptional multiaxial impact strength are limited to those substituted silanes of the formula

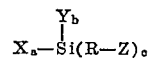

where X is a hydrolyzable group capable of reaction with a hydroxyl group, Y is a hydrogen or a monovalent hydrocarbon group, R is a divalent hydrocarbon group having from 1 to about 20 carbon atoms, Z is a primary or secondary amino, primary or secondary amido, or epoxy group, $a$ is an integer from 1 to 3, $b$ is an integer from 0.2, $c$ is an integer from 1 to 3, and the sum of $a+b+c$ equal 4. Preferably, $a$ is equal to 3, $b$ is equal to 0 and $c$ is equal to 1.

Examples of suitable X groups include halogen and hydroxy groups as well as alkoxy, cycloalkoxy, aryloxy, alkoxy-substituted alkoxy such as β-methoxyethoxy, alkoxycarbonyl, aryloxycarbonyl, alkyl carboxylate and aryl carboxylate groups, preferably having eight or less carbon atoms. Examples of Y groups in the above formula are hydrogen, methyl, ethyl, vinyl, isobutyl, phenyl and other hydrocarbyl groups, preferably having ten or less carbon atoms. The function of the Y group can be to modify the extent of the polymer-filler bonding or compatibility, to regulate viscosity of the monomer slurry or polymer mix or to modify the thermal stability of the coupler. The R group can be any divalent hydrocarbon group having up to about 20 carbon atoms and preferably from about 2 to about 18 carbon atoms; examples include ethylene, propylene, isobutenylene, decylene, undecylene, octadecylene, phenyl and toluyl groups. Usually the Z group is separated from the silicon atom by an R group having at least two carbon atoms in the linking chain. As the number of carbon atoms in the R group increases, the coupler can perform as a viscosity reducer. Further, the activity of the Z group on the divalent hydrocarbon R group is often modified somewhat by the length of the divalent R group, thereby making the coupler perform more suitably under some processing conditions. Among the Z groups suitable for use herein the primary amino and the epoxy groups are particularly preferred. Specific examples of coupling agents are γ-aminopropyl triethoxysilane, $(C_2H_5O)_3SiC_3H_6NH_2;$ γ-aminopropyl trimethoxysilane, $(CH_3O)_3SiC_3H_6NH_2;$ γ-aminopropyl phenyl dimethoxysilane,

γ-glycidoxypropyl tripropoxysilane,

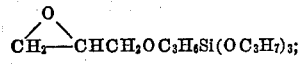

3,4 epoxycyclohexylethyl trimethoxysilane, $C_6H_7OC_2H_4Si(OCH_3)_3;$

γ-propionamido triethoxysilane, $NH_2COC_2H_4Si(OC_2H_5)_3$

N-trimethoxysilylpropyl-N(β-aminoethyl)amine, $(CH_3O)_3SiC_3H_6NHC_2H_4NH_2;$ and N-trimethoxysilylundecyl amine, $(CH_3O)_3SiC_{11}H_{22}NH_2.$ It has previously been theorized in U.S. 3,419,517 that chemical bonds may be formed between polyamide and coupler, and between coupler and inorganic filler but this has not been conclusively established. Other theories suggest an intermolecular interaction between the polyamide and coupler made possible by mutual compatibilty, and the reaction of the coupler with itself to form a cross-linked network around each filler particle. However, these mechanisms are possible for many organosilane couplers not useful in this invention. It is speculatively theorized that the limited class of couplers useful in this invention provides sufficient bonding or adhesion between the inorganic filler and polyamide to adequately transfer long duration forces (compressive tensile, shear, etc.) from the polyamide matrix to the filler phase, yet not such a rigid bond that it is incapable of elasticity or yielding to short term forces (such as impacts of various kinds). It is also theorized that the type of filler itself might beneficially affect the morphology of the composition at the polymer-filler interface. Whatever the mechanism of the interaction, to which we do not intend to be bound, those couplers which have the above mentioned functional groups can provide compositions with excellent multiaxial impact properties whereas couplers not containing such functional groups generally provide compositions with inferior impact properties.

Adhesion of polymer and coupler can be achieved under any conditions which permit thorough contact of the two components. One means has been to mix together coupler, filler and polyamide-forming monomers and conduct a polymerization. Another means has been to mix thoroughly a coupler, filler and preformed polymer. Yet another means has been to mix monomer and coupler followed by filler. One preferred method has been to pretreat the filler with coupling agent and then add the resultant adduct to either a polyamide-forming monomer system or to a preformed polyamide resin. Other techniques which provide the requisite contact of polymer and coupler can also be used. Reaction might occur by several mechanisms such as aminolysis. Aminolysis can occur by reaction of amino groups or by amide interchange with primary or secondary amido groups with the amide groups of the polymer. Another possible reaction, characterized as trans-amidation, involves the interchange between the amide groups of the coupler and the amide groups of the polymer. Finally, the reaction between an epoxy function on a coupler and the amide groups of the polymer can also take place. It should be noted in connection with the above comments on polyamide-functional group reaction that neither complete nor instantaneous reaction may be necessary. That is, if covalent bonding of polymer and coupler is responsible for the extraordinary improvement achieved by the practice of this invention, it is further theorized that only a fraction of the possible polymer-coupler bonds may provide as good or nearly as good properties in the finished composition as would a complete reaction.

A second consideration regarding the adhesion of polymer and filler is the coupler-filler interface. Filler and coupler can be joined by combining them in the absence or presence of a solvent for the coupler, such as water, alcohol, dioxane, benzene, etc. Presumably, the hydrolyzable group of the coupler reacts with the surface of the crystalline filler, or with other hydrolyzable groups of other coupler molecules located at or near the surface of the filler, to form bonds between the coupler molecules and the particles of filler. Other theories can be advanced which deny the existence of true covalent bonds between inorganic filler and coupler. Regardless of any theoretical explanation advanced herein, to which we do not intend to be limited, the coupler is attached to the filler by contacting the two substances. The mixture is preferably but not necessarily subsequently dried. A bond between the filler and coupler is thus obtained. The reaction of filler and coupler can be carried out separately, and the filler-coupler adduct subsequently added to the monomer or preformed polymer, or the reaction may be carried out in the presence of the monomer or polymer and the whole mixture dried to remove volatile reaction products and solvents, if used. Preferably, heat in the range of 50 to 200° C. or more is applied to a coupler-filler adduct to increase the extent of bonding.

The amount of coupler with which the filler is treated is usually relatively small, ranging from about 0.1 to about 5 percent by weight, preferably from about 0.25 to about 2 percent by weight, based on the weight of the filler.

One method of preparing the reinforced polyamides of the instant invention comprises mixing together a polyamide, coupler and inorganic filler under conditions which provide thorough contact of the filler-coupler adduct with the polyamide. For example, a suitable filler with a maximum particle size of about 30 microns, coupler and high molecular weight polyamide resin can be placed in a container and agitated to achieve some sort of crude dispersion. The dispersion is then processed through an extruder and chopped into granules which then may be injection molded. Other processing techniques for compounding preformed polymers with other materials may also be used to prepare compositions of this invention such as mixing by means of a KO Kneader or combining the compounding and manufacturing operations in a reciprocating screw-ram type injection molding machine. Another processing technique comprises milling the components followed by compression molding or calendering. Oxidative degradation associated with the milling operation becomes a problem, however, unless care is taken to exclude oxygen during the milling operation. In carrying out these compounding operations, the filler may either be pretreated with the coupler or treated with coupler in the presence of the polyamide. Other processing techniques are also applicable to this invention.

Direct blending of the preformed polyamide with a coupler and filler as described above has certain disadvantages, particularly at relatively high loadings, e.g. 10 volume percent or more. Specifically, thorough dispersion of filler in the polyamide phase becomes more difficult to achieve at the higher levels of loadings. And poor dispersion of filler in polymer produces compositions with unsatisfactory mechanical properties. Because the apparent viscosity of the reinforced polyamides of the invention increases with increasing filler content, higher energy consumption, higher temperatures and higher shear conditions are necessary to effect complete dispersion of the more highly loaded compositions. Unfortunately, the higher temperature and shear necessary increases the probability of polyamide degradation and depolymerization, and the attendant molecular weight lowering may affect the properties of the finished composition. Should the intrinsic viscosity of the polyamide matrix be degraded to a value much below about 1.3, the high multiaxial impact strength of the composition will be impaired.

One preferred method, therefore, for preparing compositions of this invention is by polymerizing polyamide-forming monomers in the presence of coupler-treated filler, the dispersion of said filler being effected in the less viscous monomer rather than in the preformed polymer. Compositions having a branched or crosslinked polyamide phase can also be readily prepared in this manner, with the polymerization taking place in a mold having the shape of the desired article.

A preferred process used with considerable success in the practice of this invention has been to conduct a base-catalyzed, substantially anhydrous polymerization of a lactam having a coupler-treated filler dispersed therein. The filler can be treated with the coupler prior to its addition to the lactam monomer or the treatment can be achieved by mixing together filler, coupler, monomer and other optional additives. Base-catalyzed, substantially anhydrous lactam polymerizations are carried out by methods known to those skilled in the art and described in U.S. 3,017,391, U.S. 3,017,392, U.S. 3,018,273, U.S. 3,028,369, U.S. 3,386,943 and other references. One procedure suitable for preparing reinforced polyamides comprises first mixing the lactam monomer, coupler, filler, water and, if desired, a crosslinking agent, internal mold release agent, stabilizer or other additives. Mixing is most effectively carried out if the lactam is in a molten condition. When high concentrations of reinforcing agent are used, e.g. 35 or 40% by weight or more, it may be advisable to add the components in the order just given in order to effectively disperse the ingredients. If water is used, it is advisable to use a small quantity, less than 10% of the total weight of the mixture, so that its complete removal from the mixture is facilitated. About 1 to 5% water based on the weight of the mixture is usually sufficient. After thorough mixing, the mixture is heated to about 110 or 120° C. but less than 160° C. to remove any water and the hydrolyzed R groups of the coupler. A vacuum can be applied to aid in removing the volatile materials. The temperature of the mixture is then adjusted to some temperature above the melting point of the lactam, about 100° C. for ε-caprolactam, and the polymerization catalyst is added. Any of the catalysts known to be acceptable for base-catalyzed lactam polymerizations are adequate. A preferred catalyst is an alkyl-magnesium halide such as ethylmagnesium bromide. Another preferred catalyst is sodium caprolactam. If a Grignard reagent is used, the temperature of the mixture is held around 100° C. to permit the volatilization of the alkane formed by reaction of the Grignard with the lactam monomer. Following addition of the catalyst and removal of alkane if necessary, a promoter, also known as an initiator, is added. Any of the initiators useful in base-catalyzed lactam polymerizations can be used. Examples include carbon monoxide; acyl caprolactams such as acetyl caprolactam; N,N'-substituted carbodiimides such as diisopropylcarbodiimide and dicyclohexylcarbodiimide; and N,N-substituted cyanamides such as N,N-diphenyl cyanamide. Other suitable initiators include lactams having attached to the imido group a heterocyclic substituent containing from one to three heterocyclic atoms wherein at least one of the heterocyclic atoms is a nitrogen atom and wherein the imido group of the lactam is attached to a carbon atom in the heterocyclic ring so situated that the nitrogen atom of the imido group and the nitrogen atom of the heterocyclic ring are connected by an odd number of conjugated carbon atoms. Examples of this class of initiators include: N-(2-pyridyl)-ε-caprolactam; N-(4-pyridyl)-ε-caprolactam; tris-N-(2,4,6-triazino)-ε-caprolactam; and N-(2-pyrazinyl)-ε-caprolactam. These initiators can be formed by the in situ reaction of a lactam with such compounds as 2-chloropyridine, 4-bromopyridine, 2-bromopyrazine, 2-methoxypyrazine, 2-methoxypyrazine, 2,4,6-trichloro-s-triazine, 2-bromo - 4,6 - dichloro-s-triazine, and 2,4-dimethoxy-6-chloro-s-triazine. A preferred class of initiators, namely organic isocyanates, is described in detail in U.S. 3,028,-369. Specific initiators preferred in the present polymerization include phenyl isocyanate, 2,4- and 2,6-tolylene diisocyanate, di-(p-isocyanatophenyl) methane and a polyfunctional isocyanate such as Mondur MR manufactured by Mobay Chemical Company. Alternately, the initiator may be added before the catalyst. Whichever procedure is followed, once the mixture contains the monomer, promoter, and catalyst, for most systems it is necessary to keep the temperature below 140° C., preferably below 120° C. to prevent too rapid polymerization until the mixture is cast. Some catalyst-initiator systems, such as the alkyl magnesium chloride-acetyl caprolactam system, will require even a further reduction in heat to less than 80° C. to prevent polymerization. It is also advisable when employing a reactive catalyst-promoter system to reduce the time intervening between the addition of the catalyst-initiator and the casting or molding of the mixture. After the mixture has been thoroughly stirred and allowed to come to equilibrium, the mixture is cast into a mold, which is preferably preheated, and polymerized at a temperature from about the melting point of the lactam up to about 295° C., preferably from about 140 to about 200° C. Time for polymerization can vary from as little as one minute or less up to an hour or more and usually requires from two or three minutes up to about ten minutes with most preferred catalyst-initiator systems. Other lengths of time and temperatures for polymerization are of course satisfactory and can be used with equal or nearly equal success.

Selection of specific coupling agents can provide important benefits in the preparation of reinforced polyamides by a base-catalyzed lactam polymerization process. For instance, U.S. 3,017,392 describes the use of polymerization regulators in a base-catalyzed lactam polymerization. By choosing an aminosilane coupler such as 3-triethoxysilylpropyl amine, the coupler can function as a polymer adherent, filler adherent and polymerization regulator simultaneously.

In addition, reactants, reaction conditions, catalysts and initiators must be selected and controlled so that the finished product will contain a polyamide matrix with the requisite viscosity average molecular weight and the exceptional properties of the compositions of this invention. One way in which this can be readily accomplished is by the preparation of compositions which have a crosslinked or branched polyamide phase. For example, to produce such compositions, polyfunctional monomers such as those mentioned hereinabove and others known to the art, may be included in the reaction mixture with a coupler-treated filler, a lactam or mixture of lactams, and the catalysts, initiators and promoters described above. Polyfunctional initiators such as those described above are also useful in preparing crosslinked or branched polyamide compositions. It should be recognized that moderately or highly crosslinked polyamide compositions should be cast and polymerized in their desired final shape since they are not thermoplastic materials. Branched or lightly crosslinked polylactam compositions may be cast into some intermediate form such as pellets, and later reformed into other shapes, but molecular weight degradation, in the high shear and temperature conditions of reforming, may be extensive for these compositions. Therefore, a process permitting the dispersion of filler in an unpolymerized lactam, which is subsequently polymerized to a high molecular weight linear polyamide is preferred.

The polymerization casting process described above can be used to prepare finished articles by utilizing a mold having the necessary configuration to produce the desired shape. Or the process can be used to prepare powder, pellets or beads of reinforced polyamide, or sheets, strands or rods which can be comminuted to form powder or pellets, which can be subsequently molded into a desired shape. Molding operations which can be successfully used include injection molding, compression molding, extruding, thermoforming operations such as blow molding and vacuum forming, and in general molding processes where the polymer is heated to or above its melt temperature before or during the molding cycle. When the reinforced polyamides of this invention are to be subjected to a subsequent molding process at or above the melt temperature of the polyamide, it has been found that certain catalyst systems used in the polymerization of the polyamide have a very noticeable effect on the properties of reinforced polyamides in their final molded shape. For processes where the reinforced high molecular weight polyamide is first prepared by a base-catalyzed, substantially anhydrous, anionic polymeriztion of lactam in the presence of coupler-treated filler, and the resultant polyamide is subsequently molded at temperatures at or above the melt temperature of the polyamide matrix, particularly preferred catalysts are the alkaline earth metal lactams and the lactam alkaline earth metal halides. Representative examples include calcium caprolactam chloride, magnesium caprolactam bromide, barium valerolactam iodide, magnesium caprolactam, calcium lauryllactam and others.

Lactam alkaline earth metal halides may be produced by mixing alkaline earth metal lactams and alkaline earth metal halides, either prior to, or in conjunction with admixture with a lactam monomer. They may also be prepared by contacting a lactam, such as ε-caprolactam, with a Grignard reagent. For example, ε-caprolactam, when contacted with ethylmagnesium bromide will produce caprolactam magnesium bromide and ethane. These preferred catalysts, when used in conjunction with a monofunctional initiator such as acetyl caprolactam, can provide compositions with a high molecular weight polylactam matrix which may be remolded without excessive molecular weight degradation. Preferred catalysts are magnesium lactams, mixtures of magnesium lactams and magnesium halides, or lactam magnesium halides. A particularly preferred catalyst is caprolactam magnesium bromide as prepared from Grignard reagent and ε-caprolactam.

Other catalysts, among them the most conventional catalysts for use in lactam polymerizations, are not as suitable for the preparation of the compositions of this invention as the catalysts described above. The alkali metal catalysts, such as sodium caprolactam, which are quite capable of catalyzing a reaction to prepare high molecular polyamide as well as reinforced high molecular weight polyamide, are nevertheless definitely not preferred for use in preparing compositions which are to be subsequently remolded. The properties, particularly the multiaxial impact strength, of such remolded reinforced polyamides are significantly inferior to the corresponding properties of molded reinforced polyamides. Use of the alkali metal lactam catalysts, and any other catalyst system customarily used in the base-catalyzed polymerization of lactams, is nevertheless definitely included within the scope of this invention. If, after the reinforced polyamide is polymerized according to the practice of this invention using an alkali metal catalyst such as sodium hydride or sodium caprolactam, the resultant composition is leached to remove the minute quantities of sodium, the reinforced polyamide can then be molded at a temperature above its melt temperature to form articles having mechanical properties in all respects equivalent to the properties of articles formed from compositions containing alkaline earth metal catalysts. Leaching can be carried out by washing the finely divided particles of reinforced polyamide with water or a dilute solution of formic or hydrochloric acid. Inasmuch as an additional step to remove alkali metal catalysts is required to provide a molding powder which can subsequently be molded to produce articles with good mechanical properties, the use of alkaline earth metal catalysts is definitely preferred but not required.

It will be recognized by those skilled in the art that the preparation of linear polylactams requires the use of a monofunctional initiator, such as acetyl caprolactam, as opposed to a polyfunctional initiator such as toluene diisocyanate. In addition, those skilled in the art recognize the inverse relationship between initiator concentration and molecular weight of the polymerized lactam. To produce a high molecular weight polyamide matrix with an intrinsic viscosity of 1.3 or more, relatively small amounts of initiator should be used. Additional amounts of initiator above the amount necessary to produce a high molecular weight polyamide may be necessary because of very minor amounts of impurities such as water in the polymerization mixture which tend to destroy the initiator. A particularly preferred composition having a linear, high molecular weight polyamide phase is prepared from a coupler-treated filler and ε-caprolactam monomer, the polymerization reaction being catalyzed by caprolactam magnesium bromide as prepared from Grignard reagents. A preferred initiator, usually used in quantities of less than 7 millimoles per mole of caprolactam, is acetyl caprolactam. For completely anhydrous polymerizations where virtually all of the initiator will function usefully, less than 4 millimoles of initiator should be used per mole of caprolactam. Compositions prepared using these preferred catalysts and having an intrinsic viscosity of at least 1.3 may be cast into any shape, including strands or pellets, useful in conventional processing and manufacturing equipment such as injection molding machines.

Regarding the preparation of castable compositions by these methods, it may be advisable, particularly in the case of high loadings of reinforcing agents where a slight increase in viscosity caused by partial polymerization cannot be tolerated, to provide means for injection of the initiator (or alternately the catalyst) into the monomer mixture as it is being poured or forced into the mold. Such a technique completely prevents an increase in viscosity of the monomer mixture due to polymerization until the mixture is cast. Another technique useful with high loadings of filler which aids in overcoming the difficulties presented by high viscosity is a pressurized injection of the monomer mixture into the mold. Another technique which has been found useful in decreasing the viscosity of monomer-filler-coupler slurries comprises adding a small amount of a surface-active agent to the slurry. Such a decrease in viscosity is advantageous for two reasons. First, permits the formation of a finer, smoother finish on the final product. Occasionally a finished composition with a high reinforcing agent content, e.g. above 60% by weight filler, may have a granular or coarse texture and may even contain voids or open spaces due to the inability of the viscous mixture to flow together completely prior to polymerization. The addition of minor amounts of a surface-active agent eliminates this problem and produces a smooth, attractive finish on highly reinforced compositions. Secondly, if a smooth finish is not a necessary feature for certain applications, then a decrease in viscosity permits incorporation of larger amounts of reinforcing mineral into the monomer mixture. The surface-active agent may be either anionic, cationic, nonionic or mixtures thereof. Examples include zinc stearate, dioctadecyl dimethyl ammonium chloride, and ethylene oxide adducts of stearic acid. Preferred compounds are the metal and quaternary ammonium salts of long-chain carboxylic acids. A concentration of a surfactant in the range of 0.05 to 0.5% by weight of the total composition has been found useful. However, lower concentrations can also be used. At higher concentrations of surface-active agent, it may be necessary to use additional catalyst and promoter.

In addition to the base-catalyzed, substantially anhydrous anionic lactam polymerization referred to above, reinforced polyamides can also be prepared by the conventional hydrolytic polymerization of lactams in the presence of coupler and filler as well as by polymerization of amino-caproic acids.

Another advantageous method of preparing the compositions of this invention involves the precipitation of a high molecular weight polyamide from solution onto filler which has been treated with a coupling agent. For example, a slurry of a coupler-treated filler may be prepared in a solvent for polyamides. A high molecular weight polyamide is dissolved in this slurry at elevated temperatures, and the temperature then lowered until the polyamide crystallizes from solution onto the surface of the filler. Alternatively, the polymer may be dissolved in the solvent prior to the addition of the filler, and after the preparation of a slurry, the polymer may be precipitated from the solvent by pouring the slurry and dissolved polyamide into a nonsolvent compatible with the solvent. Preferred solvents are the theta solvents such as exemplified hereinabove, although other polyamide solvents may also be used. After drying, the polymer-coated filler thus obtained may be injection or compression molded into useful articles. This method is particularly advantageous for the preparation of very highly loaded compositions, some of which are not injection moldable, but which may be readily melt blended with an additional amount of a polyamide to form an injection moldable material, or which may be used alone as a molding powder which can be formed into a dense, hard material.

The composites of this invention are characterized by mechanical properties not previously obtainable in particulate-reinforced polyamides. Like some prior art compositions, those of this invention may be formulated for specific applications by preparing compositions which are lower in some property values to achieve a necessary improvement in others. But the range of combinations of mechanical properties which can be developed with compositions of this invention is considerably broader than that previously achieved by particulate reinforced polyamides.

To be more specific, the compositions of this invention have a multiaxial impact strength, as measured by the falling ball impact test described hereinafter, of at least twice that achieved for prior art reinforced compositions having a polyamide resin matrix with an intrinsic viscosity significantly below 1.3.

Some of the preferred compositions of the invention have multiaxial impact strengths six or more times those of prior art compositions having the same flexural modulus and a lower molecular weight polyamide matrix. The six fold or more increase in multiaxial impact strength, shown by the preferred compositions of this invention over prior art compositions represents a significant improvement in polyamide compositions as practical engineering materials. For example, while prior art compositions having a flexural modulus of about a million may have a dry multiaxial impact strength of less than 2 foot pounds as measured by the impact test described below, preferred compositions of this invention with a flexural modulus of about a million may have a dry multiaxial impact strength of greater than 14 foot pounds. Other mechanical properties of these compositions, such as flexural strength and tensile strength are also excellent.

The invention will be more clearly understood from the detailed description of the following specific examples describing the preparation, testing and superior properties of some of the preferred compositions.

Unless otherwise noted, test specimens used in the following examples are injection molded from cylindrical pellets approximately $\frac{1}{10}''$ long and $\frac{1}{10}''$ in diameter which have been dried at about 80° C. and about 10 mm. Hg in a vacuum oven for 16 hours or until the moisture level is less than 0.2% by weight of the polyamide phase. The pellets are molded into test specimens by a Van Dorn reciprocating screw injection molding machine in which the mold temperature is maintained at about 350° F. by a circulating oil heat exchanger. The barrel temperatures in the machine are set at about 500° F. and test specimens are made with the machine operating automatically with a screw back pressure of about 200 p.s.i.g., an injection pressure of about 1200 p.s.i.g., a mold cycle time of about one minute and an injection time of about 2 to 3 seconds.

The first 50 to 100 specimens of a composition are discarded and only those specimens made after the machine is equilibrated are tested. After molding, the specimens are either sealed in metal cans and tested within one hour or are dried at about 80° C. and 10 mm. Hg in a vacuum oven for 16 hours immediately prior to testing.

Since polyamides tend to absorb water, which because of its plasticizing effect increases impact strength, testing of polyamide compositions must be carried out on specimens having equivalent amounts of moisture in the polyamide phase in order to have comparative results which are valid. This is most easily accomplished by equilibrating samples with an easily reproducible environment, such as those of either boiling water or a vacuum oven. Equilibration of test specimens with the essentially anhydrous environment of a vacuum oven is chosen for these examples because the high performance compositions of this invention are excessively difficult to break with the test equipment described below if the polyamide phase is plasticized with even moderate amounts of moisture.

Flexural strength and modulus of elasticity values are measured as described in ASTM D-790 and Izod notched impact strength is measured as described in ASTM D-256, Procedure A.

Gardner impact strength is measured according to the procedure set forth in Cohen et al., Materials Research and Standards, Volume 9, No. 5, pages 21 to 24 (1969). An empirical relationship between the Gardner impact strength and the following described multiaxial impact strength is as follows:

Multiaxial Impact Strength (also called Falling Ball Impact or FBI)=0.014 (Gardner Impact)$^2$.

The following is a tabulation showing the correlation between the two impact strength measurements.

| Gardner, in. lbs.: | FBI, ft. lbs. |
|---|---|
| 10 | 1.4 |
| 20 | 5.6 |
| 30 | 12.5 |
| 40 | 22.5 |
| 60 | 50 |

Multiaxial impact strength is measured by a falling ball impact test described as follows:

Injection molded specimens prepared as described above, $\frac{1}{8}''$ thick with other dimensions of at least 3½" x 3½" are clamped into a three inch diameter ring holder and a 2 pound steel ball is dropped from a height of 6" onto the unsupported center of the clamped specimen. Provided there is no failure, the ball is subsequently dropped onto the center of the specimen from heights repeatedly incremented by 6" until failure is indicated by the first appearance of a crack in the specimen, and the value of this height is recorded. A second specimen of the same composition is then tested once from a height 6" lower than that at which the first specimen failed, and this value is recorded. If the second specimen does not fail, a third specimen is tested once from a height 6" higher than that used for the previous specimen, and this value recorded. If the second specimen does fail, a third is tested from a height 6" lower than that used for the previous sample and this value recorded. The two pound ball is dropped once on the center of successive specimens of the same composition from heights determined by adjusting the height of the previous test 6" up or down, respectively, dependent upon the success or failure of the previous specimen. The height from which each specimen is tested is recorded, and specimens are tested until 20 values are obtained, after which approximately ½ of the specimens have failed. The falling ball impact measure of the multiaxial impact strength is calculated by averaging the sum of the products of each recorded height with the weight of the steel ball.

EXAMPLE 1

Nylon 6 having an intrinsic viscosity of 2.2 is melt blended in an extruder with ¼" long fine glass fibers treated with γ-aminopropyl triethoxysilane to form a uniform composition containing 40 percent by weight of glass fiber reinforcement. The multiaxial impact strength and flexural modulus of this composition are reported in Table I.

EXAMPLE 2

Nylon 6 having an intrinsic viscosity of 2.0 is melt blended in an extruder with powdered mica of a particle size such that 100% passes through a 200 mesh sieve of the U.S. Sieve Series (sieve opening, 74 microns) and 50% passes through a 325 mesh sieve (50% greater than 44 microns) and 1% by weight based on the weight of the mica of α-aminopropyl triethoxysilane coupling agent to form a uniform composition containing 40 percent by weight (22 volume percent) of the mica. The multiaxial impact strength and flexural modulus of this composition are reported in Table I.

EXAMPLE 3

Nylon 6 having an intrinsic viscosity of 2.1, talc having a particle size such that 100% is 40 microns or less and 95% is 15 microns or less and 1% by weight based on the weight of the talc of γ-aminopropyl triethoxysilane coupling agent are melt-blended in an extruder to form a composition containing 40 percent by weight (22 volume percent) of talc. Properties are reported in Table I.

EXAMPLE 4

Nylon 6 having an intrinsic viscosity of 1.95, powdered feldspar of a particle size such that 100% passes through a 200 mesh sieve of the U.S. sieve series and 50% is retained on a 325 mesh sieve (50% greater than 44 microns) and 1% by weight based on the weight of the feldspar of γ-aminopropyl triethoxysilane are melt blended in an extruder to form a uniform composition containing 40 percent by weight (22 volume percent) feldspar. Properties are reported in Table I.

EXAMPLE 5

Nylon 6 having an intrinsic viscosity of 2.3, powdered wollastonite having a particle size such that 100% is 44 microns or less and 95% is greater than 37 microns, and 1% by weight based on the weight of the wollastonite of γ-aminopropyl triethoxysilane are melt blended in an extruder to form a uniform composition containing 40% by weight (22 volume percent) wollastonite. Properties are reported in Table I.

EXAMPLE 6

Nylon 6 having an intrinsic viscosity of 2.4, a kaolin clay having a maximum particle size of 10 microns and an average particle size of 2 microns, and 1% by weight, based on the weight of the kaolin of γ-aminopropyl triethoxysilane are melt blended in an extruder to form a uniform composition containing 40% by weight (22 volume percent) kaolin clay. Properties are reported in Table I.

EXAMPLE 7

A powdered slate having a size distribution such that 100% has a particle size of 15 microns or less, 85% has a particle size of less than 8.5 microns and 48% has a particle size less than 5 microns is calcined at a temperature of 600° C. for 3 hours. A nylon 6 having an intrinsic viscosity of 2.4, the calcined slate described above, and 1% by weight based on the weight of the calcined slate of γ-aminopropyl triethoxysilane are melt blended in an extruder to form a uniform composition containing 50% by weight calcined slate. Properties are reported in Table I.

EXAMPLE 8

A finely divided hydrated alumina (diaspore) having a maximum particle size of about 15 microns and an average particle size of about 5 microns is melt blended in an extruder with a nylon 6 having an intrinsic viscosity of 2.4 and 1% by weight, based on the weight of the hydrated alumina, of γ-aminopropyl triethoxysilane to form a uniform composition containing 40% by weight hydrated alumina. Properties are reported in Table I.

EXAMPLE 9

Nylon 6 having an intrinsic viscosity of 2.4 is melt blended in an extruder with a powdered α-alumina of a particle size such that 100% passes through a 325 mesh sieve of the U.S. Sieve Series (sieve opening, 44 microns) and 50% is greater than 37 microns, and 1% by weight based on the weight of the α-alumina of γ-aminopropyl triethoxysilane to form a uniform composition containing 40% by weight of the α-alumina. Properties are reported in Table I.

EXAMPLE 10

A finely divided hydrated alumina (trihydrate) having a maximum particle size of 15 microns and an average particle size of about 5 microns is calcined for 4 hours at a temperature of 1100° C. to drive off water and convert it to the α-crystalline form. The α-alumina thus produced is melt blended in an extruder with a nylon 6 having an intrinsic viscosity of 2.4 and 1% by weight, based on the weight of the α-alumina, of γ-aminopropyl triethoxysilane to form a uniform composition containing 40% by weight of α-alumina. Properties are reported in Table I.

EXAMPLE 11

A composition is prepared exactly as in Example 10, except that the composition contains 50% by weight α-alumina. Properties are reported in Table I.

TABLE I.—NYLON 6 COMPOSITIONS

| Example | Wt. percent filler | Particle size | Intrinsic viscosity | Coupling agent | Flexural modulus ×10⁶, p.s.i. | Multiaxial impact strength, foot pounds (dry) |
|---|---|---|---|---|---|---|
| 1 | 40% glass fibers | ¼″ long | 2.2 | Aminopropyl triethoxysilane | 0.98 | <2 |
| 2 | 40% mica | <74 microns | 2.0 | do | 0.88 | <2 |
| 3 | 40% talc | <44 microns | 2.1 | do | 1.09 | <2 |
| 4 | 40% feldspar | <74 microns | 1.95 | do | 0.79 | <3 |
| 5 | 40% wollastonite | <44 microns | 2.3 | do | 0.70 | <3 |
| 6 | 40% kaolin | About 2 microns | 2.4 | do | 0.93 | <2 |
| 7 | 50% calcined slate | Average about 5 microns | 2.4 | do | 1.1 | <2.5 |
| 8 | 40% hydrated alumina | About 5 microns | 2.4 | do | 0.75 | <2 |
| 9 | 40% α-alumina | Less than 44 microns | 2.4 | do | 0.70 | <2 |
| 10 | do | About 5 microns | 2.4 | do | 0.75 | >14 |
| 11 | 50% α-alumina | do | 2.4 | do | 0.90 | >14 |

Table I lists the properties and components of Examples 1 to 11. All are melt blended, high molecular weight nylon 6 compositions and all but Example 1 use preferred coupled fillers of this invention. A comparison of the multiaxial impact strengths of Examples 1 to 8 with Examples 9 and 10 reveals the importance of the combination of proper filler type and particle size. Example 1 demonstrates the poor multiaxial impact strength of glass fiber filled compositions while Examples 2 to 5 demonstrate the poor impact strength of various types of mineral fillers having a particle size relatively larger than that included within the scope of this invention. Example 6 demonstrates the poor impact strength of kaolin clay which has a particle size included within the scope of this invention. Example 7 demonstrates the poor impact strength of a relatively small particle size calcined slate. Example 8 demonstrates the inoperability of an alumina having a particle size, within the scope of this invention but which is not in the unhydrated form. Example 9 demonstrates the inoperability of relatively large particle size α-alumina. Examples 10 and 11 are preferred compositions of the instant invention which have excellent multiaxial impact strengths. The flexural modulus of these compositions is approximated by the Kerner equation, which expresses the modulus as a function of *volume* percent of mineral in the composition. Since α-alumina has a specific gravity of about 4 and the other minerals listed have a specific gravity of about 2.5, 40 weight percent of α-alumina represents less volume percent in a composition than do the other minerals, and hence has a lower modulus.

EXAMPLE 12

Several compositions are prepared using silane coupling agents outside the scope of this invention. In the preparation of these compositions, nylon 6 having an intrinsic viscosity listed in Table 2 and α-alumina having an average particle size of about 2 microns are melt blended in an extruder with 1% by weight, based on the weight of the α-alumina, of various silane coupling agents. The uniform compositions thus prepared contain 50% by weight α-alumina. Properties are reported in Table 2.

Table 2 presents the components and properties of compositions using various silane coupling agents outside the scope of the invention. All compositions use a high viscosity average molecular weight nylon 6 and a preferred filler, α-alumina with a maximum particle size of about 15 microns or less and an average particle size of about 2 microns, thus demonstrating the specificity of the coupling agents included within the scope of this invention in the development of high multiaxial impact strength.

TABLE II

| Example | Wt. percent filler | Particle size | Intrinsic viscosity | Coupling agent | Flexural modulus ×10⁶, p.s.i. | Multiaxial impact strength, ft. pounds (dry) |
|---|---|---|---|---|---|---|
| 12(a) | 50% α-alumina | About 2 microns | 2.4 | Vinyl triethoxy silane. | 0.95 | <2 |
| 12(b) | do | do | 2.4 | Methacryloxy-propyl trimethoxy silane. | 0.90 | <2 |
| 12(c) | do | do | 2.4 | Phenyl thiethoxy silane. | 0.90 | <2 |
| 12(d) | do | do | 2.4 | β-Cyanoethyl triethoxysilane. | 0.94 | <2 |

EXAMPLE 13

Eight pounds of a commercial nylon 6 having an intrinsic viscosity of about 1.8 (Zytel 211), 12 pounds of an α-alumina with an average particle size of about 5 microns and 0.12 pounds of γ-aminopropyl triethoxy silane are mixed for 30 seconds in a Henschel blender. The mix is passed through a 1½″ extruder using a general purpose screw with a length to diameter ratio of 12 to 1. The extrudate is ground and passed again through the extruder until three passes are completed. The intrinsic viscosity of the nylon matrix of this composition prepared by triple-extrusion melt blending is 1.2, and its multiaxial impact strength is less than 2 foot pounds. This example illustrates the difficulties of polymer molecular weight degradation that occur in the melt-blending of large amounts of an inorganic filler and a preformed polyamide, and the poor multiaxial impact strength of compositions with a polyamide matrix with an intrinsic viscosity of less than 1.3.

EXAMPLE 14

To 8 pounds of nylon 6 (Zytel 211) dissolved in 25 liters of boiling ethylene glycol is added 12 pounds of α-alumina having a maximum particle size of about 15 microns or less and an average particle size of about 5 microns which has been pretreated with 0.12 pounds of γ-aminopropyl triethoxysilane. The slurry thus obtained is cooled to room temperature, allowing the dissolved nylon to precipitate out onto the coupler-treated α-alumina. The polymer-coated mineral is washed three times with water and once with methanol and then dried in a vacuum oven at 80° C. for 16 hours. The resulting powder is injection molded into test specimens as described above. The composition has a multiaxial impact strength of greater than 10 foot pounds and a flexural modulus of about $1.2 \times 10^6$ p.s.i. A comparison with Example 13 shows the advantage of polyamide deposition from solution over extrusion melt blending for high filler loadings when the molecular weight degradation associated with thorough melt-blending might reduce the intrinsic viscosity of the polyamide in the finished composition to a value below that required for compositions of this invention.

EXAMPLE 15

A composition is prepared as in Example 14 from 6 pounds of nylon 6 with an intrinsic viscosity of 2.4 dissolved in 20 liters of boiling ethylene glycol, and 14 pounds of α-alumina with a maximum particle size about 15 microns or less and an average particle size of about 2 microns which has been pretreated with 0.14 pounds of γ-aminopropyl triethoxysilane. The resulting, dried, polymer-coated mineral powder is compression molded into test specimens which have a multi-axial impact strength greater than 8 foot pounds and a flexural modulus of about $1.5 \times 10^6$ p.s.i.

EXAMPLE 16

A quantity of 9.3 pounds of a commercial α-alumina with a maximum particle size of 15 microns or less and an average particle size of about 5 microns and 6 pounds of ε-caprolactam are placed in a 5 gallon glass-lined kettle fitted with a vacuum distillation column, thermometer and mechanical stirrer. The caprolactam is melted and 0.093 pounds of γ-aminopropyl triethoxysilane are added to the kettle with stirring. The contents of the kettle are heated to 180° C. and 1 pound of caprolactam is distilled off under vacuum. The mineral-caprolactam slurry is cooled to 130° C. and enough sodium caprolactam catalyst is added with stirring so that the catalyst concentration is 10 millimoles of sodium caprolactam per remaining mole of ε-caprolactam. The slurry is then cooled to 100° C. and enough hemamethylene diisocyanate initiator is added with stirring so that the initiator concentration is 10 millimoles of hexamethylene diisocyanate per remaining mole of ε-caprolactam. The resulting initiated slurry is cast into 10" x 10" x ⅛" vertical press molds preheated to a temperature of 150° C. The sheets are cured at that temperature for 45 minutes, cooled to 100° C. and enough hexamethylene diisocyan- from the sheets.

The test specimens, contain 65% by weight (about 40 volume percent) α-alumina, and have a multiaxial impact strength of greater than 12 foot pounds and a flexural modulus of $1.2 \times 10^6$ pounds per square inch. Other properties include a flexural strength of 18,200 pounds per square inch and a notched Izod impact strength of 1.1 foot pounds per inch of notch. The polymer matrix was crosslinked and insoluble in m-cresol and therefore has an intrinsic viscosity which is very high.

EXAMPLE 17

Nylon 6 having an intrinsic viscosity of 2.4 (Plaskon 8205) is melt blended in an extruder with α-alumina having a maximum particle size of 15 microns or less and an average particle size of about 2 microns, and 1% by weight based on the weight of the α-alumina of γ-glycidoxypropyltrimethoxysilane, to form a uniform composition containing 50% by weight α-alumina. Properties are as follows:

Flexural modulus: $0.88 \times 10^6$ p.s.i.
Multiaxial impact: greater than 14 ft. lbs.
Gardner impact: 130

EXAMPLE 18

Nylon 6 having an intrinsic viscosity of 1.7, a commercial calcined kaolin clay having a maximum particle size of about 15 microns or less an average particle size of about 2 microns (Whitetex) and 1% by weight based on the weight of the calcined kaolin of γ-aminopropyl triethoxysilane are melt blended in an extruder to form a composition containing 40% by weight calcined kaolin. Properties are reported in Table III.

EXAMPLE 19

A composition is prepared exactly as in Example 18, except that the composition contains 50% by weight calcined kaolin clay as opposed to the 40% calcined kaolin of Example 18. Properties are reported in Table III.

EXAMPLE 20

A quantity of 60 parts of nylon 6 having an intrinsic viscosity of 2.4 is mixed with 40 parts by weight of a quartz filler having the following particle size distribution:

98.1% finer than 200 mesh (74μ)
82.8% finer than 325 mesh (44μ)
48.3% finer than 15μ, and 1% by weight of the quartz of γ-aminopropyltriethoxysilane. The components are injection molded to provide a composition which is tested to ascertain its mechanical properties. Results are reported in Table III.

EXAMPLE 21

The procedure of Example 20 is repeated except that the silica used has the following particle size distribution:

100% finer than 30μ
95.8% finer than 15μ
78.4% finer than 10μ

Results are reported in Table III.

EXAMPLE 22

The procedure of Example 20 is repeated except that the silica used has the following particle size distribution:

99.8% finer than 30μ
96.0% finer than 15μ
88.5% finer than 10μ

Results are reported in Table III.

EXAMPLE 23

Example 22 is repeated exactly except that the quantities of filler and polymer are altered to provide a composition containing 60% by weight silica. Results are reported in Table III.

EXAMPLE 24

Anhydrous quartz having a maximum particle size of about 10 microns and an average particle size of about 5 microns is mixed with anhydrous molten ε-caprolactam at a temperature of 120° C. The quartz, prior to its addition to the caprolactam, has been pretreated with 0.5% by weight of 3-aminopropyl triethoxysilane. To the mixture of filler and monomer is added 7 millimole of toluene diisocyanate per mole of caprolactam, followed by 9 millimoles of sodium caprolactam per mole of caprolactam. The mixture is stirred under vacuum for a minute and then cast into a sheet mold preheated to 180° C. and maintained at that temperature for three minutes. The finished composition containing 60 weight percent quartz, is withdrawn from the mold and tested. The intrinsic viscosity of the polymer is greater than 5.0. Properties are reported in Table III.

EXAMPLE 25

Example 24 is repeated except that the quartz filler used is more plate-like in shape than the quartz used in Example 24. The maximum and average particle sizes of the

EXAMPLE 26

Example 24 is repeated except that the filler used is mullite having a maximum particle size of about 37 microns, a 95% particle size of 15 microns or less and an average particle size of about 8 microns. Properties are reported in Table III.

EXAMPLE 27

Example 24 is repeated except that the filler used is feldspar having a maximum particle size of about 8 microns and an average particle size of about 5 microns. Properties are reported in Table III.

EXAMPLE 28

Example 24 is repeated except that the filler used is wollastonite having a maximum particle size of about 15 microns and an average particle size of about 10 microns. Properties are reported in Table III.

EXAMPLE 29

Example 24 is repeated except that the filler used is an anhydrous quartz where 70 to 75% of the quartz is between 44 and 74 microns. Properties are reported in Table III.

EXAMPLE 30

Example 24 is repeated except that the filter used in an anhydrous quartz where 95% of the quartz is between 44 and 74 microns. Properties are reported in Table III.

EXAMPLE 33

Eight pounds of a commercial nylon 6 having an intrinsic viscosity of about 1.7 (Zytel 211), 12 pounds of a calcined kaolin clay with an average particle size of about 2 microns (Whitetex) and 0.12 pounds of $\gamma$-aminopropyl triethoxysilane are mixed for 30 seconds in a Henschel blender. The mix is passed through a 1½ inch extruder using a general purpose screw with a length to diameter ratio of 12 to 1. The extrudate is ground and passed again through the extruder until three passes are completed. The intrinsic viscosity of the nylon matrix of this composition prepared by triple-extrusion melt blending is 1.2, and its multiaxial impact strength is less than 2 foot pounds. This example illustrates the difficulties of polymer molecular weight degradation that occur in the melt-blending of larger amounts of an inorganic filler and a preformed polyamide.

EXAMPLE 34

To 8 pounds of nylon 6 (Zytel 211) dissolved in 25 liters of boiling ethylene glycol is added 12 pounds of a kaolin clay having an average particle size of about 5 microns (ASP-400) which has been calcined at a temperature of 800° C. for 4 hours and pretreated with 0.12 pounds of $\gamma$-aminopropyl triethoxysilane.

The slurry thus obtained is cooled to room temperature, allowing the dissolved nylon to precipitate out onto the coupler-treated calcined kaolin. The polymer-coated mineral is washed three times with water and once with

TABLE III.—NYLON 6 COMPOSITIONS

| Example | Wt. percent filler | Particle size | Intrinsic viscosity | Flexural modulus $\times 10^6$, p.s.i. | Multiaxial impact strength, foot lbs. (dry) | Gardner impact, inch lbs. (dry) |
|---|---|---|---|---|---|---|
| 18 | 40% calcined kaolin | Average about 2 microns | 1.7 | 0.84 | >14 | |
| 19 | 50% calcined kaolin | About 2 microns | 1.7 | 0.98 | >14 | |
| 20 | 40% quartz | <74 microns | 2.4 | 0.70 | <2 | |
| 21 | do | <30 microns | 2.4 | 0.80 | 6 | |
| 22 | do | <30 microns | 2.4 | 0.90 | >14 | |
| 23 | 60% quartz | <30 microns | 2.4 | 1.1 | >14 | |
| 24 | do | Maximum 10 microns | >5.0 | 0.96 | >16 | 133 |
| 25 | do | Maximum 10 microns | >5.0 | 0.94 | >16 | 82 |
| 26 | 60% mullite | Maximum 37 microns, 95% 15 microns or less, average 8 microns. | >5.0 | 0.86 | >16 | 139 |
| 27 | 60% feldspar | Maximum 8 microns | >5.0 | 0.70 | >16 | 144 |
| 28 | 60% wollastonite | Maximum 15 microns | >5.0 | 0.85 | >16 | 140 |
| 29 | 60% quartz | 70% greater than 44 microns | >5.0 | 0.90 | <2 | 14 |
| 30 | do | 95% greater than 44 microns | >5.0 | 0.88 | <2 | 11 |

EXAMPLE 31

Several additional compositions are prepared using silane coupling agents outside the scope of this invention. In the preparation of these compositions, nylon 6 having an intrinsic viscosity listed in Table IV and either calcined kaolin clay (Whitetex) or quartz silica are used. Both the calcined kaolin and the quartz have maximum particle sizes of 15 microns and average particle sizes of 2 to 3 microns. The filler indicated in Table IV is melt blended in an extruder with 1% by weight, based on the weight of the filler of various silane coupling agents. The uniform compositions thus prepared contain 50% by weight filler.

methanol and then dried in a vacuum oven at 80° C. for 16 hours. The resulting powder is injection molded into test specimens as described above. The composition has a multiaxial impact strength of greater than 10 foot pounds, and a flexural modulus of 1.1 $\times 10^6$ p.s.i. A comparison with Example 32 shows the advantage of polyamide deposition from solution over extrusion melt blending for high filler loadings when the molecular weight degradation associated with thorough melt-blending might reduce the $M_v$ of the polyamide in the finished composition to a value below that required for compositions of this invention.

TABLE IV

| Example | Wt. percent filler | Particle size | Intrinsic viscosity | Coupling agent | Flexural modulus $\times 10^6$, p.s.i. | Multiaxial impact strength, ft. pounds (dry) |
|---|---|---|---|---|---|---|
| 31A | 50% calcined kaolin | About 2 microns | 1.8 | Vinyl triethoxy silane | 1.08 | <2 |
| 31B | 50% calcined kaolin | do | 2.4 | Methacryloxypropyl trimethoxy silane. | 0.86 | <3 |
| 31C | 50% calcined kaolin | do | 2.4 | Phenyl triethoxy silane | 0.94 | <2 |
| 31D | 50% calcined kaolin | do | 2.4 | $\beta$-Cyanoethyl triethoxysilane. | 0.91 | <2 |
| 31E | 50% quartz | do | 2.4 | Vinyl triethoxy silane | 1.0 | <2 |
| 31F | 50% quartz | do | 2.4 | Methacryloxypropyl trimethoxy silane. | 0.95 | <2 |
| 31G | 50% quartz | do | 2.4 | Phenyl triethoxy silane | 0.90 | <2 |
| 31H | 50% quartz | do | 2.4 | $\beta$-Cyanoethyl triethoxysilane. | 0.95 | <2 |

EXAMPLE 35

A composition is prepared as in Example 14 from 6 pounds of nylon 6 with an intrinsic viscosity of 2.4 dissolved in 20 liters of boiling ethylene glycol, and 14 pounds of calcined kaolin clay with an average particle size of about 2 microns (Whitetex) which has been pretreated with 0.14 pounds of γ-aminopropyl triethoxysilane. The resulting, dried, polymer-coated mineral powder is compression molded into test specimens which have a multiaxial impact strength greater than 8 foot pounds and a flexural modulus of $1.2 \times 10^6$ p.s.i.

EXAMPLE 36

Five pounds of calcined kaolin clay having an average particle size of about 2 microns (Whitetex) and 6 pounds of ε-caprolactam are placed in a 5 gallon glass-lined kettle fitted with a vacuum distillation column, thermometer and mechanical stirrer. The caprolactam is melted and 0.05 pounds of γ-aminopropyl triethoxysilane are added to the kettle with stirring. The contents of the kettle are heated to 180° C. and 1 pound of caprolactam is distilled off under vacuum. The mineral-caprolactam slurry is cooled to 130° C. and 55 ml. of 3 molar ethyl magnesium bromide catalyst dissolved in diethyl ether (0.165 moles of ethyl magnesium bromide) is added with stirring. The slurry is degassed under vacuum to remove the ether and hydrocarbon vapors and then cooled to 100° C. Then 0.043 pounds of toluene diisocyanate initiator (TD-80, 6 millimoles per remaining mole of ε-caprolactam) are added to the slurry with stirring, and the resulting initiated slurry is cast into 10" x ⅛" vertical press molds preheated to a temperature of 150° C. The sheets are cured at that temperature for 45 minutes, cooled to room temperature, and test specimens are cut from the sheets. The cast test specimens have a multiaxial impact strength of greater than 12 foot pounds, and a flexural modulus of $1.0 \times 10^6$ p.s.i. The intrinsic viscosity of the polycaprolactam matrix is 2.3.

EXAMPLE 37

Nylon 6 having an intrinsic viscosity of 2.4 (Plaskon 8205) is melt blended in an extruder with a calcined kaolin clay having an average particle size of about 2 microns and 1% by weight based on the weight of the calcined kaolin of γ-propionamidotriethoxysilane to form a composition containing 50% by weight calcined kaolin. Properties are as follows:

Flexural strength, p.s.i. _____ 24,500
Flexural modulus, p.s.i. _____ $0.94 \times 10^6$
Multiaxial impact, foot lbs. _____ 10
Gardner Impact, in. lbs. _____ 27

EXAMPLE 38

Eight pounds of a commercial nylon 6 having an intrinsic viscosity of about 1.7 (Zytel 211), 12 pounds of quartz with an average particle size of about 5 microns, the type used in Example 13, and 0.12 pounds of γ-aminopropyl triethoxysilane are mixed for 30 seconds in a Henschel blender. The mix is passed through a 1½" extruder using a general purpose screw with a length to diameter ratio of 12 to 1. The extrudate is ground and passed again through the extruder until three passes are completed. The intrinsic viscosity of the nylon matrix of this composition prepared by triple-extrusion melt blending is 1.2, and its multiaxial impact strength is less than 2 foot pounds. This example illustrates the difficulties of polymer molecular weight degradation that occur in the melt-blending of large amounts of an inorganic filler and a preformed polyamide.

EXAMPLE 39

To 8 pounds of nylon 6 having an intrinsic viscosity of 1.7 (Zytel 211) dissolved in 25 liters of boiling ethylene glycol is added 12 pounds of a quartz silica having an average particle size of about 2 microns, the type used in Example 31, which has been pretreated with 0.12 pounds of γ-aminopropyl triethoxysilane. The slurry thus obtained is cooled to room temperature, allowing the dissolved nylon to precipitate out onto the coupler-treated quartz. The polymer-coated mineral is washed three times with water and once with methanol and then dried in a vacuum oven at 80° C. for 16 hours. The resulting powder is injection molded into test specimens as described above. The composition has a multiaxial impact strength of greater than 14 foot pounds and a flexural modulus of $1.15 \times 10^6$ p.s.i. A comparison with Example 13 shows the advantage of polyamide deposition from solution over extrusion melt blending for high filler loadings when the molecular weight degradation associated with thorough meltblending might reduce the intrinsic viscosity of the polyamide in the finished composition to a value below that required for compositions of this invention.

EXAMPLE 40

A composition is prepared as in Example 39 from 6 pounds of nylon 6 with an intrinsic viscosity of 2.4, dissolved in 20 liters of boiling ethylene glycol, and 14 pounds of quartz with an average particle size of about 2 microns (maximum particle size 15 microns) which has been pretreated with 0.14 pounds of γ-aminopropyl triethoxysilane. The resulting, dried, polymer-coated mineral powder is compression molded into test specimens which have a multiaxial impact strength greater than 14 foot pounds and a flexural modulus of $1.2 \times 10^6$ p.s.i.

EXAMPLE 41

A quantity of 7.5 pounds of quartz (maximum particle size 15 microns, average particle size less than 5 microns) is placed in a 5 gallon glass-lined kettle fitted with a vacuum distillation column, thermometer and mechanical stirrer. To the kettle is added 6 pounds of ε-caprolactam. The caprolactam is melted and 0.05 pounds of γ-aminopropyl triethoxysilane is added to the kettle with stirring. The contents of the kettle are heated to 180° C. and 1 pound of caprolactam is distilled off under vacuum. The caprolactam is melted and 0.05 pound of γ-amino-55 ml. of 3 molar ethyl magnesium bromide catalyst dissolved in diethyl ether (0.165 mole of ethyl magnesium bromide) is added with stirring. The slurry is degassed under vacuum to remove the ether and hydrocarbon vapors and then cooled to 100° C. Then 0.043 pound of toluene diisocyanate initiator, TD-80 (6 millimoles per remaining mole of ε-caprolactam is added to the slurry with stirring, and the resulting initiated slurry is cast into 10" x 10" x ⅛" vertical press molds preheated to a temperature of 150° C. The sheets are cured at that temperature for 45 minutes, cooled to room temperature, and test specimens are cut from the sheets. The cast test specimens have a multiaxial impact strength of greater than 14 foot pounds, and a flexural modulus of $1.05 \times 10^6$ p.s.i.

EXAMPLE 42

Various compositions, all containing 60 percent by weight quartz, are prepared according to the process described in Example 41. Except that instead of toluene diisocyanate initiator, acetyl caprolactam is used as the initiator, in quantities of 3 millimoles per mole of caprolactam in the finished composition. The compositions are identical except for the particle size of the quartz used in each composition. Properties and the particle sizes of the quartz filler are reported in Table V.

A comparison of the multiaxial impact strengths of the compositions with a larger particle size quartz component, with those compositions having the smaller particle fillers demonstrate the importance of particle size in the development of the high multiaxial impact strength compositions of the invention.

TABLE V

| Composition | Intrinsic viscosity | Weight percent quartz | Particle size | Coupling agent | Flexural modulus ×10⁶, p.s.i. | Multiaxial impact strength, foot lbs. (per inch of notch) |
|---|---|---|---|---|---|---|
| 42A | 2.4 | 60 | 99.9% less than 74μ / 74.0% less than 15μ | γ-aminopropyltriethoxysilane. | 1.07 | <2 |
| 42B | 2.4 | 60 | 100% less than 30μ / 95.8% less than 15μ | ___do___ | 1.06 | 6 |
| 42C | 2.4 | 60 | 99.8% less than 30μ / 96.0% less than 15μ | ___do___ | 1.10 | 10 |
| 42D | 2.4 | 60 | 100% less than 15μ / 99.0% less than 10μ | ___do___ | 1.07 | >14 |
| 42E | 2.4 | 60 | 100% less than 10μ / 79.6% less than 5μ | ___do___ | 1.08 | >14 |

EXAMPLE 43

A quantity of 30 pounds of nylon 6 having an intrinsic viscosity of 2.3 is melt blended in an extruder with 2 pounds of a calcined kaolin clay (Whitex) having a maximum particle size of 15 microns or less and an average particle size of about 2 microns, which filler has been pretreated with 1% by weight of the filler of 3-aminopropyltriethoxysilane. The finished composition contains 2.7 volume percent filler.

EXAMPLE 44

Example 43 is repeated except that an uncalcined kaolin clay is used.

EXAMPLE 45

Example 43 is repeated except that 3 pounds of an α-alumina filler having a maximum particle size of 15 microns or less and an average particle size of about 5 microns is used. The finished composition contains 2.7 volume percent filler.

EXAMPLE 46

Example 45 is repeated except that a hydrated alumina (diaspore) having the same particle size as the α-alumina of Example 45 is used.

EXAMPLE 47

Example 43 is repeated except that quartz silica having the same particle size as the calcined kaolin is used. The finished composition contains 2.7 volume percent filler.

EXAMPLE 48

Example 47 is repeated except that the quartz silica has a particle size such that 70 to 75% of the particles are between 44 and 74 microns.

EXAMPLE 49

Example 47 is repeated except that the nylon 6 has an intrinsic viscosity of 1.1.

said filler material having been treated with an organosilane coupling agent of the formula:

$$X_a-\underset{Y_b}{Si}-(R-Z)_c$$

where X is a hydrolyzable group capable of reaction with a hydroxyl group, Y is a hydrogen or a monovalent hydrocarbon group, Z is a primary or secondary amino, primary or secondary amido or epoxy group, R is a divalent hydrocarbon group having from 1 to about 20 carbon atoms, $a$ is equal to 1 or more, $c$ is equal to 1 or more, and the sum of $a + b + c$ is equal to 4.

2. A composition according to Claim 1 wherein said polylactam is a copolymer containing at least 50% by weight polylactam.

3. A composition according to Claim 1 wherein said polylactam is a polyblend containing at least 50% by weight polylactam.

4. A composition according to Claim 1 wherein said polyamide is a condensation product of a dicarboxylic acid and a diamine.

5. A composition according to Claim 1 wherein said polyamide is a polymerized lactam.

6. A composition according to Claim 1 wherein said polylactam has an intrinsic viscosity of at least about 1.7.

7. A composition according to Claim 1 wherein said polylactam has an intrinsic viscosity of at least about 2.0.

8. A composition according to Claim 1 wherein said filler has a maximum particle size of about 30 microns or less.

9. A composition according to Claim 1 wherein said filler has an average particle size of about 10 microns or less.

10. A composition according to Claim 1 wherein said filler is present in an amount from about 2 to about 25 percent by volume of the total composition.

11. A composition according to Claim 1 wherein said

TABLE VI

| Composition | Intrinsic viscosity | Vol percent filler | Filler type | Filler size | Flexural modulus, p.s.i.×10⁶ | Multiaxial impact, ft., lbs. | Gardner impact in pounds |
|---|---|---|---|---|---|---|---|
| 43 | 2.3 | 2.7 | Calcined kaolin | Maximum 15μ | 0.39 | >16 | 71 |
| 44 | 2.3 | 2.7 | Uncalcined kaolin | ___do___ | 0.37 | <2 | 12 |
| 45 | 2.3 | 2.7 | α-Alumina | ___do___ | 0.44 | >16 | 82 |
| 46 | 2.3 | 2.7 | Hydrated alumina | ___do___ | 0.42 | 2 | 14 |
| 47 | 2.3 | 2.7 | Quartz silica | ___do___ | 0.42 | >16 | 75 |
| 48 | 2.3 | 2.7 | ___do___ | ___do___ | 0.42 | 5 | 18 |
| 49 | 1.1 | 2.7 | ___do___ | ___do___ | 0.37 | 6 | 21 |

What is claimed is:

1. A reinforced polyamide composition comprising
   (a) a polylactam having an intrinsic viscosity of at least about 1.3,
   (b) from about 2 to about 55 percent by volume of the total composition if a particulate inorganic filler material having a Moh's hardness of at least about 4 and a particle size such that about 100% of the particles have a particle size of about 40 microns or less and at least about 95% by weight of the particles have a particle size of about 15 microns or less, filler is present in an amount from about 10 to about 25 percent by volume of the total composition.

12. A composition according to Claim 1 wherein X is a halogen or alkoxy group, Z is an amino group, R is an alkylene group having from 2 to about 18 carbon atoms, $a$ is 3, $b$ is zero and $c$ is 1.

13. A reinforced polyamide composition comprising
   (a) a polylactam having an intrinsic viscosity of at least about 1.7,
   (b) from about 2 to about 55% by volume based on the total compisition of a crystalline inorganic filler having a Mohs hardness of at least about 4 and a particle size such that about 100% of the particles have a particle size of about 30 microns or less and about 95% by weight of the particles have a particle size of about 10 microns or less, said filler material having been treated with an organisilane coupling agent of the formula (A)₃–Si–R–B where A is a halogen or an alkoxy group, R is an alkylene group having from 2 to about 18 carbon atoms, and B is a primary or secondary amino group.

14. A composition according to Claim 13 wherein said polyamide is a copolymer containing at least 90% by weight polyamide.

15. A composition according to Claim 13 wherein said polylactam is a polyblend containing at least 90% by weight polyamide.

16. A composition according to Claim 13 wherein said polylactam is a condensation product of a dicarboxylic acid and a diamine.

17. A composition according to Claim 13 wherein said polylactam is nylon 6,6.

18. A composition according to Claim 13 wherein said polyamide is a polylactam.

19. A composition according to Claim 13 wherein said polyamide is polycaprolactam.

20. A composition according to Claim 13 wherein said filler is used in quantities of from about 10 to about 45 percent by volume of the total composition.

21. A composition according to Claim 13 wherein said filler is used in quantities of from about 2 to about 10 percent by volume of the total composition.

22. A composition according to Claim 13 wherein said filler has an average particle size of less than about 5 microns.

23. A composition according to Claim 13 wherein said organosilane coupling agent is a λ-aminopropyl trialkoxysilane where the alkoxy groups have up to 8 carbon atoms.

24. A composition according to Claim 13 wherein the multiaxial impact strength is greater than 10 foot pounds.

25. A composition according to Claim 13 wherein said polyamide is nylon 6 or nylon 6,6, said filler has an average particle size of less than about 5 microns, and said organosilane coupling agent is λ-aminopropyl trialkoxysilane where the alkoxy groups have up to 8 carbon atoms, said organosilane coupling agent being used in quantities of from about 0.25 to about 2 percent by weight of said filler.

26. A process for preparing a reinforced polyamide composition comprising
(a) treating a particulate inorganic filler material having a Moh's hardness of at least about 4 and a particle size such that about 100% of the particles have a particle size of about 40 microns or less and at least about 95% by weight of the particles have a particle size of about 15 microns or less, with an organosilane coupling agent of the formula:

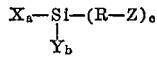

where X is a hydrolyzable group capable of reaction with a hydroxyl group, Y is a hydrogen or a monovalent hydrocarbon group, Z is a primary or secondary amino, primary or secondary amido or epoxy group, R is a divalent hydrocarbon group having from 1 to about 20 carbon atoms, $a$ is equal to 1 or more, $c$ is equal to 1 or more, and the sum of $a+b+c$ is equal to 4; to form a coupler-treated reinforcing agent, and
(b) carrying out in the presence of said reinforcing agent, a base-catalyzed substantially anhydrous anionic polymerization of a lactam monomer to form a polylactam with an intrinsic viscosity of at least about 1.3, such quantities of said lactam monomer being polymerized in the presence of said reinforcing agent to provide compositions containing from about 2 to about 55 percent by volume of said filler material.

27. A process according to Claim 26 wherein said organosilane coupling agent has the following formula:

(A)₃–Si–R–B where A is a halogen or an alkoxy group having a maximum of 8 carbon atoms, R is an alkylene group having from about 2 to 18 carbon atoms, and B is an amino or epoxy group.

28. A process according to Claim 26 wherein said polymerization is carried out with a monofunctional initiator.

29. A process according to Claim 26 wherein said polymerization is carried out with an alkaline earth metal lactam or an alkaline earth metal lactam halide catalyst.

30. A process according to Claim 26 where the polymerized product is subsequently injection molded.

31. A process according to Claim 26 wherein said filler has an average particle size of about 5 microns or less.

32. A process according to Claim 26 wherein said organosilane coupling agent is γ-aminopropyl trialkoxysilane where the alkoxy groups have up to 8 carbon atoms.

33. A process according to Claim 26 wherein said lactam monomer is ε-caprolactam.

34. A process according to Claim 26 wherein said catalyst is a lactam magnesium halide.

35. A process according to Claim 26 wherein said initiator is acetyl caprolactam.

36. A process according to Claim 26 wherein said filler has an average particle size of about 5 microns or less, said organosilane coupling agent is γ-aminopropyl trimethoxysilane or γ-aminopropyl triethoxysilane, said lactam monomer is ε-caprolactam, said catalyst is caprolactam magnesium bromide, and said initiator is acetyl caprolactam.

37. A process according to Claim 26 wherein the polylactam has an intrinsic viscosity of at least about 1.7.

38. A process according to Claim 26 wherein said reinforced polyamide composition is subsequently remolded at or above its melt temperature.

39. A process according to Claim 38 wherein said reinforced polyamide composition is subsequently vacuum molded.

40. A process according to Claim 38 wherein said reinforced polyamide composition is subsequently vacuum formed.

41. A process for preparing a reinforced polyamide composition comprising
(a) treating a particulate inorganic filler material having a Moh's hardness of at least about 4 and a particle size such that about 100% of the particles are about 40 microns or less and at least about 95% of the particles are 15 microns or less, with an oragnosilane coupling agent of the formula:

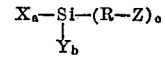

where X is a hydrolyzable group capable of reaction with a hydroxyl group, Y is a hydrogen or a monovalent hydrocarbon group, Z is a primary or secondary amino, primary or secondary amido, or epoxy group, R is a divalent hydrocarbon group having from about 1 to about 20 carbon atoms, $a$ is equal to 1 or more, $c$ is equal to 1 or more, and the sum of $a+b+c$ is equal to 4; to form a coupler-treated reinforcing agent,
(b) incorporating said filler material into a polyamide having an intrinsic viscosity of at least about 1.3 in an amount which will provide a composition having from about 2 to about 55% by volume filler, and
(c) subsequently forming the resultant composition at a temperature above the melt temperature of the polyamide in the composition to form a molded article.

42. A process according to Claim 41 wherein said filler has an average particle size of about 10 microns or less.

43. A process according to Claim 41 wherein said organosilane coupling agent is γ-aminopropyl trialkoxysilane where the alkoxy groups have up to 8 carbon atoms.

44. A process according to Claim 41 wherein said filler has an average particle size of less than about 5 microns and wherein said organosilane coupling agent is γ-aminopropyl trialkoxysilane where the alkoxy groups have up to 8 carbon atoms.

45. A process according to Claim 44 wherein said polyamide is nylon 6 or nylon 6,6 having an intrinsic viscosity of at least about 1.7.

46. A process according to Claim 41 wherein said composition is injection molded.

47. A process according to Claim 41 wherein said filler is incorporated into said polyamide by polymerizing the polyamide in the presence of the filler.

48. A process according to Claim 41 wherein said filler is incorporated into said polyamide by placing the filler in a polyamide solution and precipitating said polyamide from said solution.

49. A reinforced polyamide article comprising a polyamide having an intrinsic viscosity of at least about 1.3 and from about 2 to about 55% by volume based on the total composition of a particulate inorganic filler material having a Moh's hardness of at least about 4 and a particle size such that about 100% of the filler particles are about 40 microns or less and at least about 95% of the filler particles are about 15 microns or less, said filler having been treated with an organosilane coupling agent of the formula:

$$X_a-\underset{\underset{Y_b}{|}}{Si}-(R-Z)_c$$

where X is a hydrolyzable group capable of reaction with a hydroxyl group, Y is a hydrogen or a monovalent hydrocarbon group, Z is a primary or secondary amino, primary or secondary amido, or epoxy group, R is a divalent hydrocarbon group having from 1 to about 20 carbon atoms, $a$ is equal to 1 or more, $c$ is equal to 1 or more, and the sum of $a+b+c$ is equal to 4.

50. A composition according to Claim 1 wherein said filler is calcined kaolin clay.

51. A composition according to Claim 13 wherein said filler is calcined koalin clay.

52. A composition according to Claim 1 wherein said filler is crystalline.

53. A composition according to Claim 13 wherein said filler is crystalline.

References Cited

UNITED STATES PATENTS

| | | | |
|---|---|---|---|
| 3,419,517 | 12/1968 | Hedrick | 260—37 |
| 3,386,943 | 6/1968 | Hedrick | 260—37 |
| 3,328,339 | 6/1967 | Tierney | 260—37 |
| 2,852,485 | 9/1958 | Stott | 260—37 |
| 2,748,099 | 4/1956 | Bruner et al. | 260—37 |
| 3,290,165 | 12/1966 | Clannicelli | 106—308 |
| 3,390,120 | 6/1968 | Clannicelli | 260—37 |

MORRIS LIEBMAN, Primary Examiner

R. ZAITLEN, Assistant Examiner

UNITED STATES PATENT OFFICE
CERTIFICATE OF CORRECTION

Patent No. 3,833,534　　　　　　　　Dated September 3, 1974

Inventor(s)　　Paul A. Tierney et al.　　　　Page 1 of 4

It is certified that error appears in the above-identified patent and that said Letters Patent are hereby corrected as shown below:

Col. 1, line 4, delete "Paul A. Tierney, Ballwin, and"

Col. 1, line 5, delete "James D. Gabbert" and substitute "William R. Richard, Jr."

Col. 1, line 32, insert after "1969" ", now abandoned,".

UNITED STATES PATENT OFFICE
CERTIFICATE OF CORRECTION

PATENT NO. : 3,833,534
DATED : September 3, 1974      Page 2 of 4
INVENTOR(S) : Paul A. Tierney et al It is certified that error appears in the above-identified patent and that said Letters Patent are hereby corrected as shown below:

Col. 28, lines 35 to 39, delete completely
Col. 28, line 40, delete "6" and substitute "4"
Col. 28, line 42, delete "7" and substitute "5"
Col. 28, line 44, delete "8" and substitute "6"
Col. 28, line 47, delete "9" and substitute "7"
Col. 28, line 50, delete "10" and substitute "8"
Col. 28, line 53, delete "11" and substitute "9"
Col. 28, line 67, delete "12" and substitute "10"
Col. 28, line 71, delete "13" and substitute "11"
Col. 28, line 75, delete "compisition of a crystalline" and substitute "composition of an"
Col. 29, line 13, delete "14" and substitute "12"
Col. 29, line 13, delete "13" and substitute "11"
Col. 29, line 14, delete "polyamide" and substitute "polylactam"
Col. 29, line 15, delete "polyamide" and substitute "polylactam"
Col. 29, line 16, delete "15" and substitute "13"
Col. 29, line 16, delete "13" and substitute "11"
Col. 29, line 18, delete "polyamide" and substitute "polylactam"
Col. 29, lines 19 to 25, delete completely
Col. 29, line 26, delete "19" and substitute "14"
Col. 29, line 26, delete "13" and substitute "11"
Col. 29, line 27, delete "polyamide" and substitute "polylactam"
Col. 29, line 28, delete "20" and substitute "15"
Col. 29, line 28, delete "13" and substitute "11"
Col. 29, line 31, delete "21" and substitute "16"
Col. 29, line 31, delete "13" and substitute "11"
Col. 29, line 34, delete "22" and substitute "17"
Col. 29, line 34, delete "13" and substitute "11"
Col. 29, line 37, delete "23" and substitute "18"
Col. 29, line 37, delete "13" and substitute "11"
Col. 29, line 38, delete "λ" and substitute "γ"
Col. 29, line 40, delete "24" and substitute "19"
Col. 29, line 40, delete "13" and substitute "11"
Col. 29, line 42, delete "25" and substitute "20"

UNITED STATES PATENT OFFICE
CERTIFICATE OF CORRECTION

PATENT NO. : 3,833,534

DATED : September 3, 1974

INVENTOR(S) : Paul A. Tierney et al

Page 3 of 4

It is certified that error appears in the above-identified patent and that said Letters Patent are hereby corrected as shown below:

```
Col. 29, line 42, delete "13" and substitute "11"
Col. 29, line 43, delete "polyamide" and substitute "polylactam"
Col. 29, line 43, delete "or nylon 6,6"
Col. 29, line 45, delete "λ" and substitute "γ"
Col. 29, line 49, delete "26" and substitute "21"
Col. 30, line 5,  delete "27" and substitute "22"
Col. 30, line 5,  delete "26" and substitute "21"
Col. 30, line 13, delete "28" and substitute "23"
Col. 30, line 13, delete "26" and substitute "21"
Col. 30, line 15, delete "29" and substitute "24"
Col. 30, line 15, delete "26" and substitute "21"
Col. 30, line 18, delete "30" and substitute "25"
Col. 30, line 18, delete "26" and substitute "21"
Col. 30, line 20, delete "31" and substitute "26"
Col. 30, line 20, delete "26" and substitute "21"
Col. 30, line 22, delete "32" and substitute "27"
Col. 30, line 22, delete "26" and substitute "21"
Col. 30, line 25, delete "33" and substitute "28"
Col. 30, line 25, delete "26" and substitute "21"
Col. 30, line 27, delete "34" and substitute "29"
Col. 30, line 27, delete "26" and substitute "21"
Col. 30, line 29, delete "35" and substitute "30"
Col. 30, line 29, delete "26" and substitute "21"
Col. 30, line 31, delete "36" and substitute "31"
Col. 30, line 31, delete "26" and substitute "21"
Col. 30, line 38, delete "37" and substitute "32"
Col. 30, line 38, delete "26" and substitute "21"
Col. 30, line 40, delete "38" and substitute "33"
Col. 30, line 40, delete "26" and substitute "21"
Col. 30, line 43, delete "39" and substitute "34"
Col. 30, line 43, delete "38" and substitute "33"
Col. 30, line 46, delete "40" and substitute "35"
Col. 30, line 46, delete "38" and substitute "33"
```

UNITED STATES PATENT OFFICE
CERTIFICATE OF CORRECTION

PATENT NO. : 3,833,534
DATED : September 3, 1974
INVENTOR(S) : Paul A. Tierney et al Page 4 of 4

It is certified that error appears in the above-identified patent and that said Letters Patent are hereby corrected as shown below:

Col. 30, line 49, delete "41" and substitute "36"
Col. 30, line 70, delete "polyamide" and substitute "polylactam"
Col. 31, line 3, delete "42" and substitute "37"
Col. 31, line 3, delete "41" and substitute "36"
Col. 31, line 5, delete "43" and substitute "38"
Col. 31, line 5, delete "41" and substitute "36"
Col. 31, line 8, delete "44" and substitute "39"
Col. 31, line 8, delete "41" and substitute "36"
Col. 31, line 13, delete "45" and substitute "40"
Col. 31, line 13, delete "44" and substitute "39"
Col. 31, line 14, delete "polyamide" and substitute "polylactam"
Col. 31, line 14, delete "or nylon 6,6"
Col. 31, line 16, delete "46" and substitute "41"
Col. 31, line 16, delete "41" and substitute "36"
Col. 31, line 18, delete "47" and substitute "42"
Col. 31, line 18, delete "41" and substitute "36"
Col. 31, line 21, delete "48" and substitute "43"
Col. 31, line 21, delete "41" and substitute "36"
Col. 31, line 25, delete "49" and substitute "44"
Col. 32, line 13, delete "50" and substitute "45"
Col. 32, line 15, delete "51" and substitute "46"
Col. 32, line 15, delete "13" and substitute "11"
Col. 32, line 17, delete "52" and substitute "47"
Col. 32, line 19, delete "53" and substitute "48"
Col. 32, line 19, delete "13" and substitute "11"
Col. 32, line 21, add the following new claim:
"54. A composition according to Claim 1 wherein said polylactam is polycaprolactam."

Signed and Sealed this twenty-seventh Day of April 1976

[SEAL]

Attest:

RUTH C. MASON
Attesting Officer

C. MARSHALL DANN
Commissioner of Patents and Trademarks